US006967662B2

(12) United States Patent
Fenney

(10) Patent No.: US 6,967,662 B2
(45) Date of Patent: Nov. 22, 2005

(54) VOLUME CLIPPING IN COMPUTER 3D GRAPHICS

(75) Inventor: Simon Fenney, Hertfordshire (GB)

(73) Assignee: Imagination Technologies Limited, Hertfordshire (GB)

( * ) Notice: Subject to any disclaimer, the term of this patent is extended or adjusted under 35 U.S.C. 154(b) by 51 days.

(21) Appl. No.: 10/432,562

(22) PCT Filed: Feb. 8, 2002

(86) PCT No.: PCT/GB02/00568

§ 371 (c)(1),
(2), (4) Date: May 22, 2003

(87) PCT Pub. No.: WO02/063567

PCT Pub. Date: Aug. 15, 2002

(65) Prior Publication Data

US 2004/0027348 A1 Feb. 12, 2004

(30) Foreign Application Priority Data

Feb. 8, 2001 (GB) ............................................ 0103194

(51) Int. Cl.$^7$ .................................................. G09G 5/00
(52) U.S. Cl. ....................................... 345/582; 345/426
(58) Field of Search ................................ 345/419–426, 345/619, 620–625, 590, 582, 584

(56) References Cited

U.S. PATENT DOCUMENTS 5,586,234 A 12/1996 Sakuraba et al.
5,870,098 A * 2/1999 Gardiner ..................... 345/426
6,025,853 A 2/2000 Baldwin
6,072,497 A * 6/2000 Lichtenbelt et al. ........ 345/424
6,230,177 B1 5/2001 Gossett et al.
6,236,404 B1 * 5/2001 Iimura et al. ............... 345/427
6,384,822 B1 * 5/2002 Bilodeau et al. ............ 345/422
6,437,782 B1 * 8/2002 Pieragostini et al. ....... 345/589
6,542,153 B1 * 4/2003 Liu et al. .................... 345/424
6,760,024 B1 * 7/2004 Lokovic et al. ............. 345/582

FOREIGN PATENT DOCUMENTS

EP 0 725 365 A1 8/1996
EP 0 725 366 A2 8/1996
EP 0 890 925 A2 1/1999

OTHER PUBLICATIONS

Great Britain Application No. GB 0103194.7, Search Report, Aug. 9, 2001 (2 pages).
PCT Application No. PCT/GB02/05458, International Search Report, May 2, 2003 (4 pages).
Batagelo, H.C., et al; "*Real–Time Shadow Generation Using BSP Trees and Stencil Buffers*", Proceedings. XII Brazilian Symposium on Computer Graphics and Image Processing, 1999, pp. 93–102.
Crow, Franklin; "*Shadow Algorithms for Computer Graphics*", Siggraph, Jul. 20–22, 1977, Sand Jose, California, pp. 242–247.
Watt & Watt; Extract from "*Advanced Animation and Rendering Techniques*", ISBN, 0–201–54412–1, pp. 158–163.

* cited by examiner

*Primary Examiner*—Matthew Luu
(74) *Attorney, Agent, or Firm*—Flynn, Thiel, Boutell & Tanis, P.C.

(57) ABSTRACT

A method and apparatus are provided for clipping modifier volumes in a 3-dimensional computer graphics generating system. Objects are represented as a set of planar polygons. An indication is then provided as to which of the polygons form modifier volumes. A determination is made as to which polygon's modifier volume intersect a clipping plane (4). Further polygons are then generated on the clipping plane within the intersections of the polygons of the modifier volume with the clipping plane and these are inserted into the set of planar polygons. The portions of the polygons which are determined to lie in front of the clipping plane are then discarded.

6 Claims, 6 Drawing Sheets

VOLUME CLIPPING IN COMPUTER 3D GRAPHICS

This invention relates to the volume clipping for computer three dimensional graphics of the type which are typically represented as closed volumes formed from a mesh of triangles in computer 3-D graphic systems. In particular, the invention applies to such volumes which are known as modifier volumes which are used for the computation of shadows and other special effect in a 3-D graphics environment.

Shadows in computer graphics play an important role to the perceived realism of a scene being generated in 3-D computer graphics. Many methods of generating shadows have been devised as graphics have progressed and examples can be found in "Computer Graphics Principles and Practice" by Foley, van Dam, Feiner, & Hughes ISBN 0-201-12110-7, and "Advanced Animation and Rendering Techniques" by Watt & Watt ISBN 0-201-54412-1. The method on which this particular invention is based is that described in "Shadow Algorithms for Computer Graphics" by F C Crow SIGGRAPH 1977 242–247, the contents of which are herein incorporated by reference.

In Crow's proposal, shadows are defined as sets of closed polyhedral volumes. The shadow volumes can be used to support other graphical modification effects and so these volumes are more generally referred to as modifier volumes. They are commonly applied to the 3-D graphics image using stencil buffer hardware which maintains a value per pixel. Two methods are commonly employed: either incrementing value when "forward facing" polygons cover the associated pixel and decrementing on "reverse facing" polygons or by counting modulo 2 when either polygon type cover the pixel.

In many computer graphics systems, especially real-time systems, the virtual environment is modelled from a set of polygons. This set of polygons is often restricted to triangles for simplicity of processing. The drawing or rendering process often requires clipping or subdivision of the subset of triangles that straddle what is know as the front; clipping plane. This front clipping plane is the same as the image plane under consideration onto which the image is being rendered.

This process of clipping is illustrated with reference to FIG. 1. In this, a viewpoint 2 is looking into a scene via a front clipping plane or image plane 4. A triangle 6 is shown which intersects the clipping plane 4. The front portion of this which is unshaded is discarded in the clipping process and the shaded section which is behind the clipping plane is passed on to the latter parts of the renderer.

This approach works with polygons which are used to represent opaque or transparent normal objects. However, when a modifier volume such as a shadow volume is used it needs to be adapted. This is because discarding a section of the modifier volume's polygons during front plane clipping will produce holes in the modifier volume. For example, a modifier volume used to generate shadows which intersects the front clipping plane will produce contributions to the shading from the portion of the volume which is in front of the front clipping plane 4 Thus, if this portion is discarded it will lead to incorrect regions being shadowed or not shadowed. FIG. 2 shows a modifier volume 8 which intersects the front clipping plane 4. It can be seen that when clipped, an open surface or hole 10 is formed in the shadow volume 8. Thus, when rendering is performed for this shadow volume there will be no front surface to enable the shadow to be computed for pixels which fall within the hole and thus incorrect shading will be applied. The production of a hole in the shadow or modifier volume contradicts the requirement that such a volume should be closed.

Conventional clipping techniques treat all triangles (or more generally planar polygons) independently when clipping them. Thus, the conventional clipping techniques are unable to take account of whether a triangle or planar polygon belongs to a modifier volume which requires different treatment when clipping.

P. Deipenbach of University of Pennsylvania proposed in his PHD Thesis of 1996 (Pipeline Rendering: Interaction and realism through hardware-based multi-pass Rendering) that a cap could be produced by repeating-all the volume polygons output by the clipping unit and "flattening" or "projecting" the results under the clipping plane. This can generate up to double the number of polygons and is therefore expensive computationally.

Preferred embodiments of the present application seeks to provide a modification to standard front plane clipping whereby triangles or polygons which form part of the modifier volume and which are in front of the front clipping plane, after they have been discarded, are used to build a front plane cap for any hole in the modifier volume formed by the clipping process. This is all done in one pass through the clipping operation without any significant storage overhead. The modifier volume on which the clipping is performed can be concave, formed of disjoined pieces, or even be self intersecting. In this latter case, however, the behaviour of the volume with depend on which fill rules are used for the volume.

The invention is defined with more precision in the appended claims to which reference should now be made.

A preferred embodiment of the preferred invention will now be described in detail by way of example with reference to the accompanying drawings in which.

Figure 1:
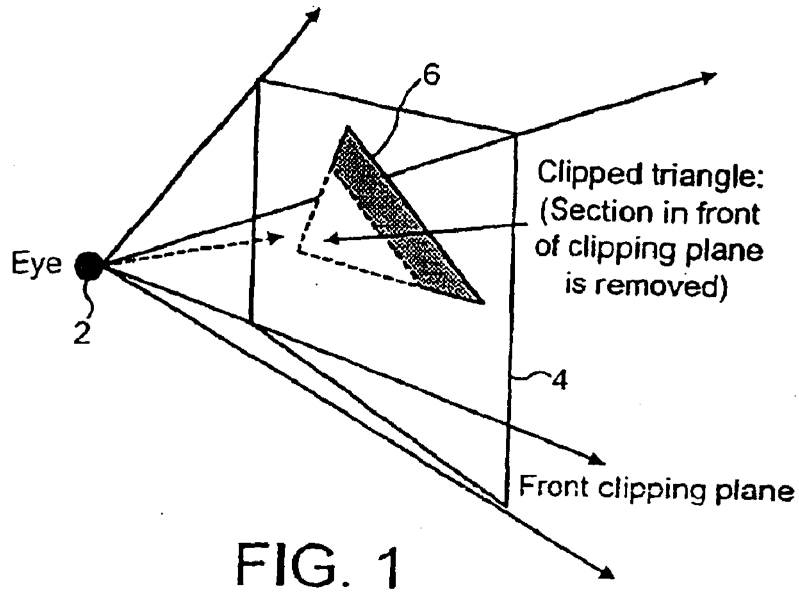
FIG. 1 is a schematic view of a clipped triangle at a front clipping plane referred to above.
Figure 2:
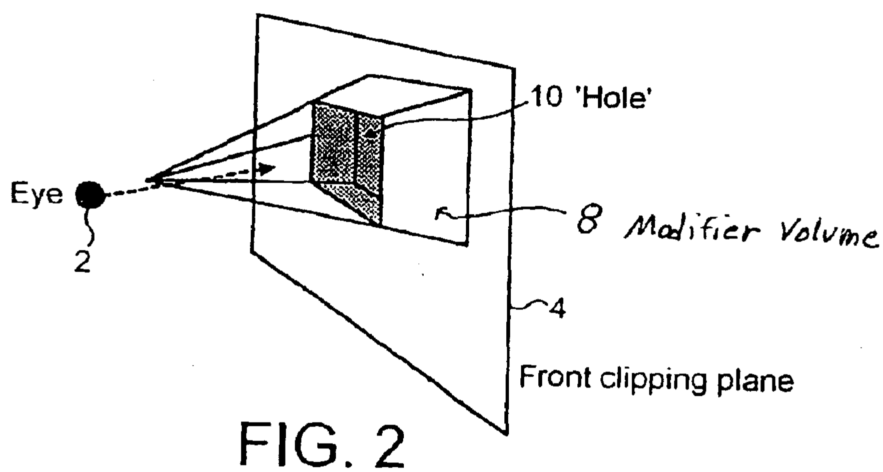
FIG. 2 is a modifier volume at a front clipping plane which illustrates the formation of a hole in the modifier volume, as referred to above.
Figure 4:
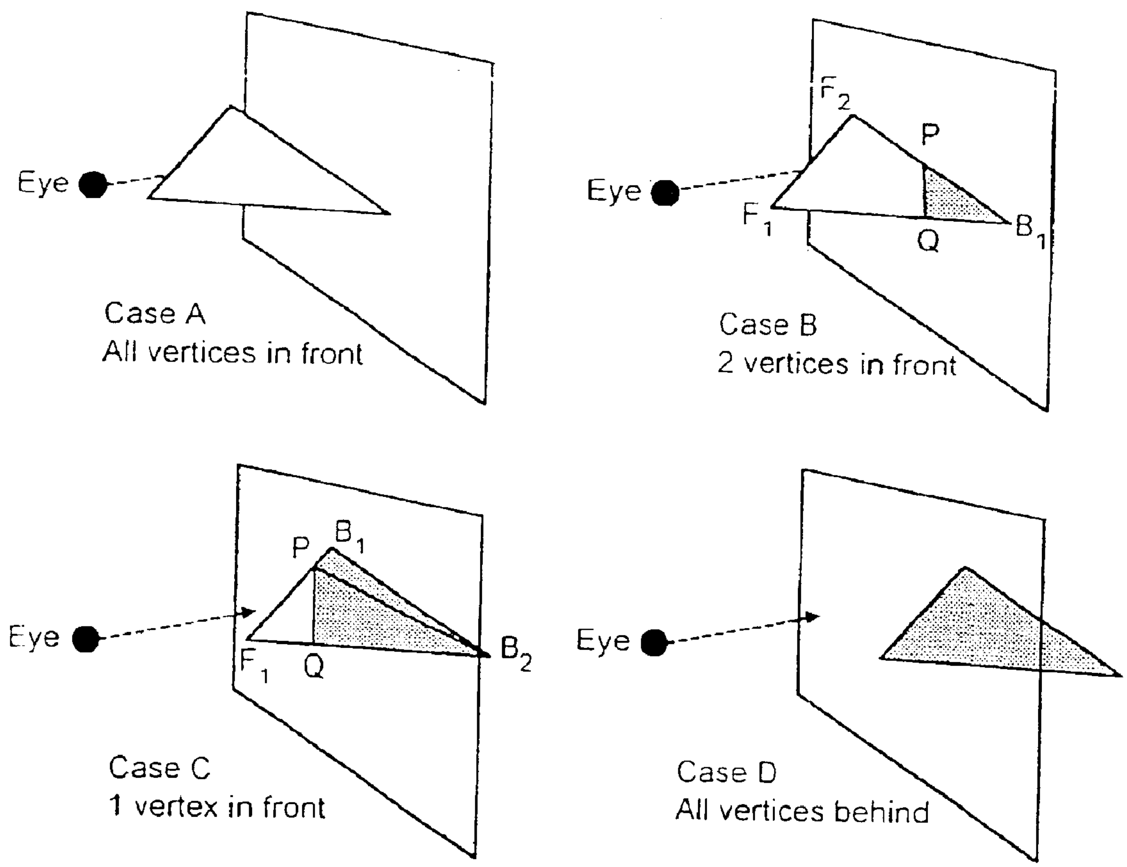
Figure 5:
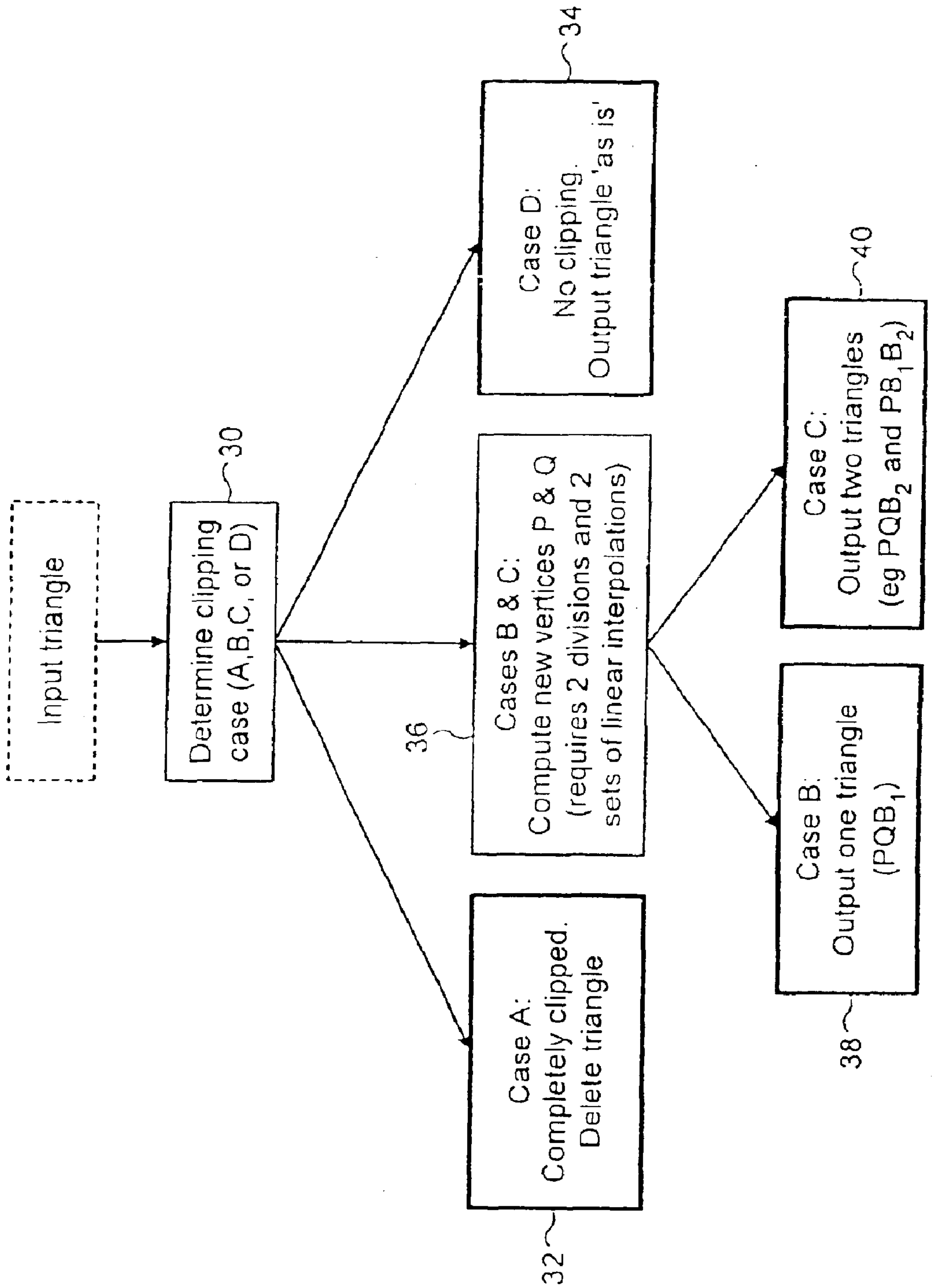
Figure 6:
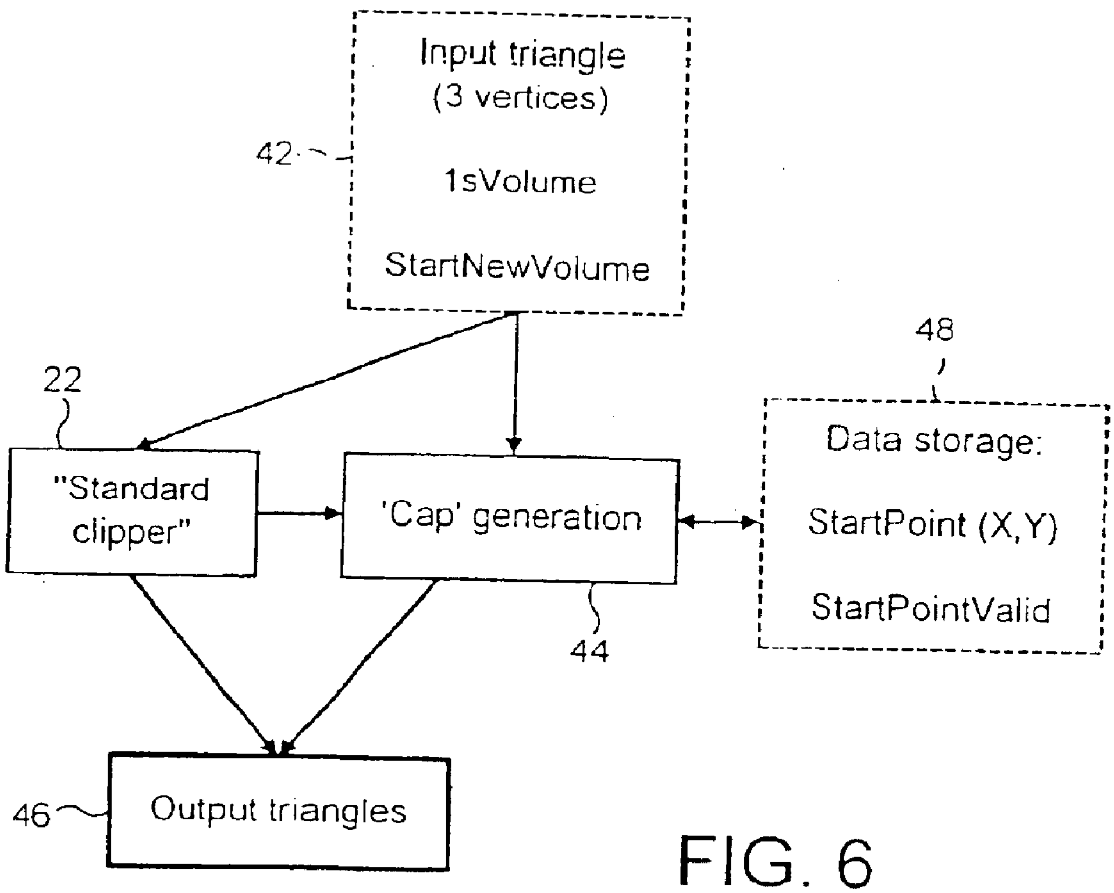
Figure 7:
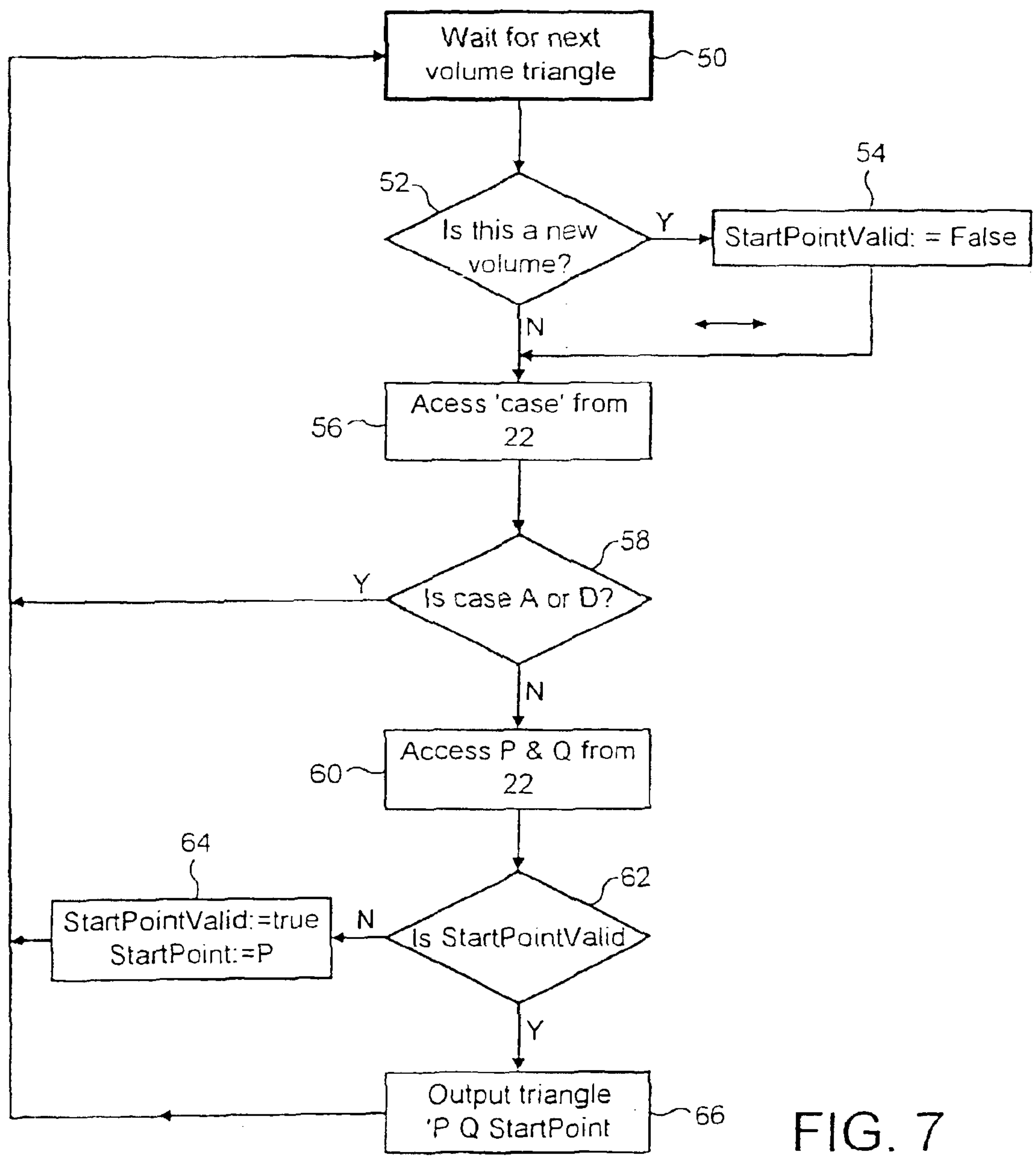
Figure 8:
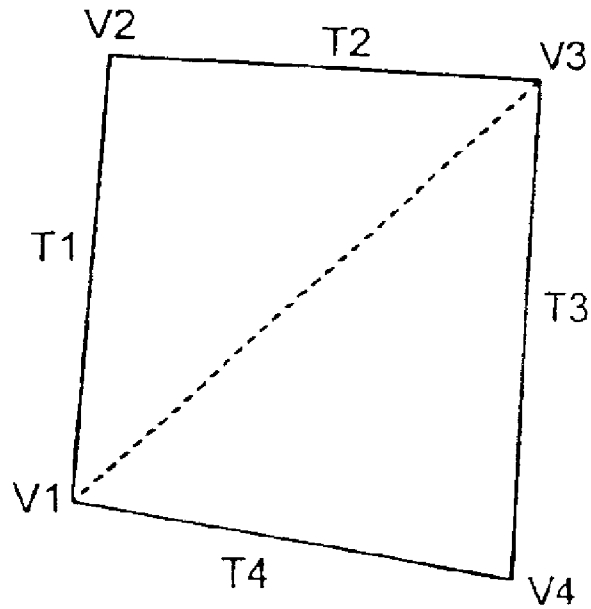
Figure 9:
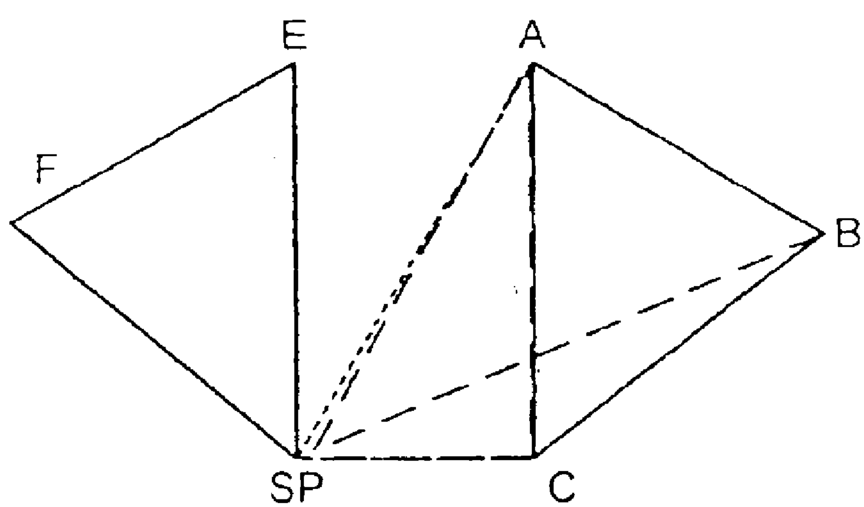

FIGS. 4*a, b, c* and *d* illustrate various different intersections of a triangle with the front plane clipping plane in a standard clipper;

FIG. 5 is a simplified illustration of how the clipping of FIG. 4 operates;

FIG. 6 is a block diagram of an embodiment of the invention;

FIG. 7 is a flow diagram illustrating the operation of the cap generator of FIG. 6;

FIG. 8 shows a cross section through the pyramid of FIG. 2 at the region where it intersects the clipping plane; and FIG. 9 shows a more complex example generated from a clipped torus.

Preferred embodiments of the invention car be implemented either in software or hardware although in practice, the invention leads itself to a hardware implementation as it requires little additional storage over a standard clipping method.

Firstly, we will discuss a standard clipper and will then describe how this is enhanced in the embodiment of the present invention. Clipping is a well known technique in the 3-D computer graphics field and will be familiar to those skilled in the art.

Figure 3:
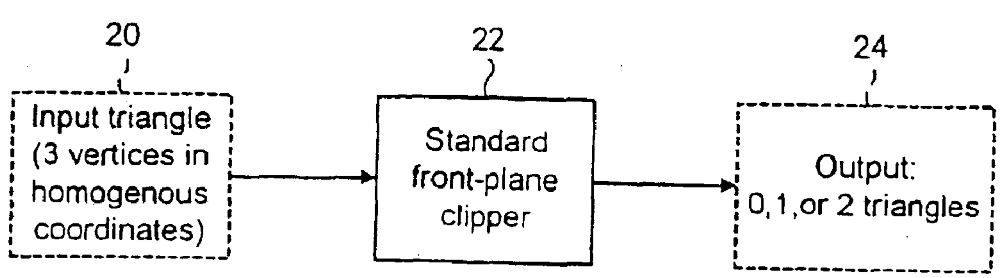
FIG. 3 is a block diagram of a standard front plane clipper.

The standard front plane clipper is illustrated in FIG. 3. This comprises an input of triangle data 20 to a standard front plane clipper 22 which has an output comprising 0, 1, or 2 triangles 24.

Each triangle input by unit 20 consists of three vertices which are usually given in homogenous coordinates. These are supplied by the input 20 to the clipper 22. This will then generate 0, 1, or 2 output triangles depending on the position of the triangle relative to the front clipping plane 4. The location of this is supplied to the front plane clipper 22 in a well known manner.

The following clipping operations are performed by the clipper 22 and are illustrated with reference to FIG. 4*a–d*. They are summarised below:

FIG. 4*a*—the triangle is completely in front of the clip plane. Therefore, the triangle can be completely rejected and therefore produces no output triangles.

FIG. 4*b*—the triangle has two vertices in front of the clipping plane. This results in a triangular area $PQB_1$ lying behind the clipping plane and therefore being provided by the output 24.

FIG. 4*c*—in this, the triangle has one vertex in front of the clipping plane. This results in a convex quadrilateral area being kept. This is split up into two output triagles which are provided by the output 24. In this example the triangles are $PB_1$ $B_2$ and PQ $B_2$. However, the alternative pair $PQB_1$ and Q $B_1B_2$ would also be a valid output.

FIG. 4*d*—in this all the vertices of the triangle are behind the clipping plane and therefore no clipping is required at all.

In cases where one or more of the vertices lie exactly on the clipping plane the above four cases can have rules written into them to deal with this so that an appropriate one of the four cases still applies.

In a preferred embodiment the triangle shown in FIG. 4*a* would be removed earlier in the processing pipeline by a culling operation using clip codes to discard at an early stage any triangles which fall wholly in front of the clipping plane. The example is shown for illustrative purposes only.

The ordering of vertices in triangles is frequently used in 3-D computer graphics as a means of identifying front facing and rear facing triangles. For the purposes of illustrating embodiment of this invention, this distinction has been ignored. Instead, the naming of the vertices in the examples are for illustrative purposes only and do not imply any order.

In FIGS. 4*b* and 4*c* the triangle actually intersects the clipping plane, the intersection consists of a line segment PQ formed from two new vertices P and Q lying where the edges of the triangle intersect the front clipping plane. The implementation of this clipping is shown in the block diagram of FIG. 5 in which an input triangle is provided to a clipping case determinator 30. This compares the depth of the vertices of the input triangle against a constant depth value or the front clipping plane if case A results, the triangle is discarded at 32. If case D applies no clipping is performed and triangle is output as it is at 34.

If either of cases B and C apply then data is passed to step 36 where the new vertices P and Q are computed from the intersection of the relevant edges of the triangle with the front clipping plane. This requires two divisions and two sets of linear interpolations to derive the vertices. The output from this step is either that illustrated in FIG. 4*b* where one triangle $PQB_1$ is output at 38 or that illustrated in FIG. 4*c* where two triangles e.g PQ $B_2$ and $PB_1$ $B_2$ are output at step 40.

More sophisticated implementations of this may be pipelined and/or may share calculations with neighbouring triangles in the input model.

Where the triangles being passed to the clipper are ones which form a modifier or shadow volume, they contain information that is need to build a cap to close a clipped volume such as that illustrated in FIG. 2. The volumes are distinguished from standard opaque or translucent objects by a flag that indicates if the stream of triangles is a modifier volume. A block diagram of apparatus for performing this is illustrated in FIG. 6. This comprises a standard clipper 20 of the type shown in FIG. 3. An input unit 42 receives triangle data. This data may consist of a mixture of standard opaque or transparent triangles and also of triangles forming modifier volumes such as shadows.

Triangle data is usually supplied to the input as a scream of data. A second flag is used when processing modifier volumes to indicate the demarcation of different modifier volumes to this embodiment, the flag is set "on" the first triangle of any modifier volume and is "off" from the remainder.

The standard clipper 22 operates in a manner similar to that of FIG. 5. It also supplies information to a cap generation unit 44. This information comprises the particular type of clipping as illustrated in FIG. 4 and in the case of FIG. 4*b* or 4*c*, it also supplies the coordinates of the computed vertices P and Q.

The clipper 20 outputs the visible portions of triangles to a buffer or fifo 46. These can then be merged with any additional triangles that may be generated by, the cap generation unit 44.

The cap generation unit takes the flags IsVolume and StartNewVolume from the input unit 42. These are then communicated with a local data storage device 48. In a hardware embodiment this local data storage will comprise registers or flipflops. The cap generation unit outputs additional triangles which are then used to form the cap within an output triangle stream which can be read from the registers or flipflops 46.

The local data storage 48 stores a single XY coordinate called the StartPoint and a single bit flag StartPointValid. This indicates whether or not correct data is present in the coordinate. The StartPoint must lie on the front clipping plane and therefore does not need a z component because this is implied by the known z value of the clip plane.

The processing applied to a polygon input to the cap generator 44 is shown in FIG. 7. This ignores "standard" model triangles as these do not require additional processing, Instead, only those triangles associated with a modifier volume are processed. Initially, the unit waits for a new triangle at 50. A determination is made at 52 as to whether or not the triangle forms part of a new volume. This is done by examining the state of the StartNewVolume flag supplied by the input unit 42 of FIG. 6. If it is a new volume the flag called StartPointValid is set to false in step 54.

Processing then passes to step 56 where the particular clipping case (FIGS. 4A, B, C or D) determined by the standard clipper 22 is accessed. If this case happens to be case A or case D then no further processing of the triangle is necessary for cap generation since no intersection of the clip plane with the triangle has taken place.

This determination is made at step 58 and in such case, the process returns to step 50.

If the clipping case is not A or D, i.e it is B or C, the next step is to retrieve the coordinates of the vertices P and Q from the standard clipper 22 at step 60. These coordinates are of course the intersection of the edges of the triangle with the front clipping plane. If the flag StartPointValid is false then this is the first triangle of the particular modifier volume that cuts the front clipping plane. Therefore, when this determination of the StartPointValid flag is made at step 62 and if it is false it is set to true at step 64 and the StartPoint value is set to P, the coordinates of the vertex P on an edge of the hole formed in the volume by the clipper. It would have been equally valid to assign the vertex Q to the StartPoint. The process then returns to step 50.

If at step 62 the determination of the StartPointValid flag is that it is set to true, then a capping triangle consisting of the vertices P, Q, and StartPoint is sent to the output triangle stream at 66. This triangle will lie entirely on the front clipping plane. These capping triangles formed from the values P, Q and StartPoint will only arise when the second or subsequent triangle forming part of a modifier volume passes through step 62 the process of FIG. 7. All such triangles of the volume will use the same StartPoint, but the P and Q values of a particular triangle may be different to these of the previous or subsequent triangle. It can be noted, however, that because the modifier volume is closed, the outcome of the cap will consist of a finite number of closed polygons. The vertices of these closed polygons are formed from the P and Q values of the clipped polygons.

This results in a stream of triangles to be output from the registers 46 of FIG. 6 which consist of the portion of the volume behind the front clipping plane, as output by the clipper 22, along with the cap polygons output at step 66 of FIG. 7 and which lie in the clipping plane. These together then form a suitable volume for use as a modifier volume. The polygons can then be rendered using a preferred technique.

The operation of the apparatus of FIGS. 6 and 7 will now be described for some examples.

In FIG. 8, a cross section of the pyramid of FIG. 2 is shown at the region where it intersects the front clipping plane. Four triangles, T1, T2, T3, and T4 are clipped by the clipping unit 22 and form new edges V1 V2, V2 V3, V3 V4, and V4 V1. If the triangles are supplied in the above order to the clipping unit 22, then the behaviour of the capping unit will be as follows:

Triangle T1 will set the StartPoint to either V1 or V2, and we shall assume here V1 is chosen. Triangle T2 will then generate the capping triangle V2, V3, V1. Triangle T3 will generate V3 V4 V1, and triangle T4 will generate a zero area V4 V1 V1. This final triangle will usually be culled by latter parts of the graphics pipeline to save on processing.

A more complex example is shown in FIG. 9. This could have been generated from a clipped torus. In this the required cap region is not only non convex but consists of two disjoint regions. The StartPoint SP is assumed to be on the left connected region and this region would be capped by the triangle non-zero EFSP as part of the process it has to be connected to the three edges of the right hand section. As a result, three rapping triangles A B SP, B C SP, and C A SP are formed. It should be noted that these individual triangles cover an area, shown in grey, that does not in fact form part of the cap. However, because of the fact that a count modulo 2 fill rule is to be used, this grey area is effectively not included because it is covered by an even number of triagles, an equivalent argument also applies if the increment/decrement fill rule is used, but is more complex to describe.

In the examples given, the SP has been chosen to be a vertex generated by the clipping process. Theoretically any point in the clipping plane could have been chosen although this could lead to large triangles being generated, which would be likely to be more costly to render during the latter stages of the 3-D pipeline.

What is claimed is:

1. A method for clipping modifier volumes where they intersect a clipping plane in a 3 dimensional computer graphics generating system, the method comprising the steps of:

representing the volumes in the image is as a set of planar polygons;

providing an indication as to which planar polygons form modifier volumes;

determining which planar polygons of a modifier volume intersect the clipping plane;

generating additional planar polygons on the clipping plane within the intersections of the planar polygons of the modifier volume with the clipping plane;

inserting these additional planar polygons into the set of planar polygons; and discarding the portions of the planar polygons determined to lie in front of the clipping plane.

2. A method according to claim 1 in which the steps of generating additional planar polygons comprises:

determining for two or more adjacent polygons of a modifier volume which intersect the clipping plane, the locations of the intersections; and generating at least one additional planar polygon between the locations of the intersection.

3. A method according to claim 1 in which the planar polygons are triangles and these triangles which form part of a modifier volume are identified by a flag.

4. A method according to claim 1 including the step of discarding any polygons which fall in front of the clipping plane.

5. Apparatus for clipping modifier volumes where they intersect a clipping plane in a 3 dimensional computer graphics generating system comprising:

means for representing the volumes in the image as a set of planar polygons;

means for providing an indicator as to which planar polygons form modifier volumes;

means for determining which planar polygons of a modifier volume intersect the front clipping plane;

means for generating additional planar polygons on the clipping plane within the intersections of the planar polygons of the modifier volume with the clipping plane;

means for inserting these additional planar polygons into the set of planar polygons; and means for discarding the portions of the planar polygons determined to lie in front of the clipping plane.

6. Apparatus according to claim 5 in which the means for generating additional planar polygons comprises means for determining for two or more adjacent planar polygons of a modifier volume which intersects the clipping plane, the locations of the intersections, and means for generating at least one further planar polygon between the locations of the intersections.

* * * * *